United States Patent
Cuce' et al.

(10) Patent No.: US 6,256,617 B1
(45) Date of Patent: *Jul. 3, 2001

(54) FUZZY LOGIC ELECTRONIC PROCESSOR

(75) Inventors: Antonino Cuce', Messina; Enrico Pelos, Palermo, both of (IT)

(73) Assignee: SGS-Thomson Microelectronics S.r.l., Agrate Brianza (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,514

(22) Filed: Aug. 1, 1997

(30) Foreign Application Priority Data

Aug. 2, 1996 (IT) .............................................. MI96A1680

(51) Int. Cl.$^7$ .................................................. G06F 15/18
(52) U.S. Cl. ...................... 706/4; 706/1; 706/9; 706/900
(58) Field of Search ............................. 706/4, FOR 101, 706/900, 1, 9

(56) References Cited

U.S. PATENT DOCUMENTS

| | | | |
|---|---|---|---|
| 5,165,011 | * 11/1992 | Hisano et al. | 706/4 |
| 5,249,258 | * 9/1993 | Hisano et al. | 706/4 |
| 5,268,847 | * 12/1993 | Potetz et al. | 708/8 |
| 5,280,624 | * 1/1994 | Ikeda | 706/4 |
| 5,371,832 | * 12/1994 | Eichfeld et al. | 706/4 |
| 5,574,826 | * 11/1996 | Russo et al. | 706/4 |
| 5,600,757 | * 2/1997 | Yammamoto et al. | 706/1 |
| 5,621,860 | * 4/1997 | Russo et al. | 706/4 |
| 5,633,986 | * 5/1997 | Rizzotto et al. | 706/1 |
| 5,657,427 | * 8/1997 | Rizzotto et al. | 706/1 |
| 5,724,483 | * 3/1998 | Gianguido et al. | 706/8 |
| 5,737,493 | * 4/1998 | Viot et al. | 706/52 |
| 5,751,908 | * 5/1998 | Madau et al. | 706/9 |
| 5,790,755 | * 8/1998 | Pagni et al. | 706/4 |
| 5,799,132 | * 8/1998 | Rizzotto et al. | 706/8 |

FOREIGN PATENT DOCUMENTS

| | | | |
|---|---|---|---|
| 0544629 A2 | * 6/1993 | (EP) | . |
| 0798631 A1 | * 10/1997 | (EP) | . |
| 0831394 A1 | * 3/1998 | (EP) | . |

OTHER PUBLICATIONS

Surmann, H.; Ungering, A.; "Fuzzy Rule–Based Systems on General–Purpose Processors"; IEEE Micro; vol. 15, No. 4, pp. 40–48, Aug. 1995.*

Basch, D.; Zagar, M.; "Processor Architecture Model for Fuzzy Control"; Proceedings of the 1995 IEEE International Symposium on Intelligent Control; pp. 189–194, Aug. 1995.*

(List continued on next page.)

Primary Examiner—George B. Davis
(74) Attorney, Agent, or Firm—Wolf, Greenfield & Sacks, P.C; James H. Morris; Theodore E. Galanthay

(57) ABSTRACT

A processor operating in a fizzy logic's mode and including a fuzzyfication unit receiving a plurality of input variables on its input and being adapted to compute a membership value of such variables in a membership function, a processing unit connected downstream of the fuzzyfication unit to produce a fuzzy set, i.e. the results of fuzzy logic inference operations performed on the plurality of variables, and a defuzzyfication unit operative to translate the inference results into a so-called crisp value. The processor further includes a first memory device connected to the fuzzyfication unit and containing the set of membership functions, a second memory device connected to the defuzzyfication unit and containing the set of crisp value which appear in the THEN part of the fizzy rules, and a further memory device connected to the defuzzyfication unit.

42 Claims, 2 Drawing Sheets

OTHER PUBLICATIONS

"Fuzzy Logic Single–Chip Solution"; Oki Electric Industry Co., Ltd.; 8 pages, Apr. 1993.*

Chieuh, T.; "Optimization of Fuzzy Logic Inference Architecture"; Computer; vol. 25, No. 5, pp. 67–71, May, 1992.*

Watanabe, H.; Symon, J.; Dettloff, W.; Yount, K.; "VLSI Fuzzy Chip and Inference Accelerator Board Systems"; Proceedings of the 21st International Symposium on Multiple–Valued Logic; pp. 120–127, May, 1991.*

* cited by examiner

FUZZY LOGIC ELECTRONIC PROCESSOR

BACKGROUND OF THE INVENTION

1. Field of the Invention

This invention relates to a fuzzy cell structure for an electronic processor operating in a fuzzy logics mode.

More particularly, the invention relates to a processor of the type which comprises a fuzzyfication unit receiving a plurality of input variables on its input and being adapted to compute a membership value of such variables in a membership function, a processing unit connected downstream of the fuzzyfication unit to produce a fuzzy set, i.e. the results of a fuzzy logics inference operations performed on said plurality of variables, and a defuzzyfication unit operative to translate said inference results into a so-called crisp value.

2. Discussion of the Related Art

As is well known, electronic processors are currently available which operate in a general purpose fuzzy logics mode, and are sold under the trade name WARP 1-2-3.

These processors are directed to solve model and control problems in processes of significant complexity characterized by having several input variables, a few control variables, a particularly high dynamic range, and precision specifications which allow some latitude.

However, there are situations where these processors are not utilized to full capacity, such as where the number of the variables involved is small. In other situations, by contrast, these processors cannot be used due to their inherently inadequate speed and precision; this being the case, for instance, with the processing of digital signals and with the control problems brought about by a high dynamic range or the need for more accurate control actions.

For a better understanding of the invention aspects, the main rules of operation of the current-generation of fuzzy processors will be reviewed briefly. These processors are capable of processing rules of the following kind:

IF $X_1$ is $A_{ij}$ and $X_2$ is $A_{2h}$ and . . . THEN Y is C or variations of this same rule wherein the decision variables X, i.e. those appearing in the IF part or portion of the rule, are backed by a sub-set $U_i \subset R$, $A_{ij}$ being one-dimension terms defined in $U_1$.

The structure of these fuzzy processors can be represented schematically by three cascaded blocks, as shown in the appended FIG. 1.

A first "Fuzzyfication Unit" block is to translate, into linguistic terms, so-called 'crisp' observations of the input variables $X_i$ by computing their membership value at each term. The membership values thus obtained are used by the "Computational Unit" to produce a fuzzy set, or term, representing the linguistic inference of the set of computed rules.

Rule processing is over once the linguistic inference is translated into a crisp value by a "Defuzzyfication Unit" block.

Further features of prior art fuzzy processors can be learned from European Patent Applications No. EP96830173.9 and EP96830090.5 by the Applicant, which are incorporated herein by reference.

An object of the invention is to provide a compact-size dedicated processor which has such structural and functional features that it can solve control problems involving few variables and still be sufficiently fast and accurate for use in the processing of digital signals.

This would allow certain limitations of conventional processors to be overcome.

SUMMARY OF THE INVENTION

The solution idea behind the invention is of making an appropriate choice of the fuzzy model to be used, that is of the type of rules to be used, and above all, of the type of membership functions.

With the intention of placing no limitations on the number of rules to be used in a given system, since computing complexity would be dependent in any case on the number of rules, we have considered acting on the number of rules that are active each time, and identifiable by their having a non-zero degree of activation. In this way, the number of rules can be kept always relatively small, and the activated rules are always identifiable within the rule data base.

On the basis of the above solution idea, we have been able to find a model having the following properties:

1) the sum of the membership functions through the universe of discourse is unity;
2) at any point of the universe of discourse, there are only two membership functions with a non-zero degree of membership;
3) the only aggregation operator used is the AND operator.

Differently from what a quick look into the matter may suggest, the conditions for the use of this model are not constrictive. The resulting fuzzy model is indeed complete, and offers several advantages to be specified hereinafter.

In accord with the above solution idea, the technical problem is solved by a processor as previously indicated and comprising a first memory device connected to the fuzzyfication unit and containing the set of membership functions, a second memory device connected to the defuzzyfication unit and containing the set of crisp value which appear in the THEN part of the fuzzy rules, and a further memory device connected to the defuzzyfication unit.

The features and advantages of the fuzzy processor of this invention will be apparent from the following description of an embodiment thereof, given by way of illustration and not of limitation with reference to the accompanying drawings.

DETAILED DESCRIPTION

Figure 1:
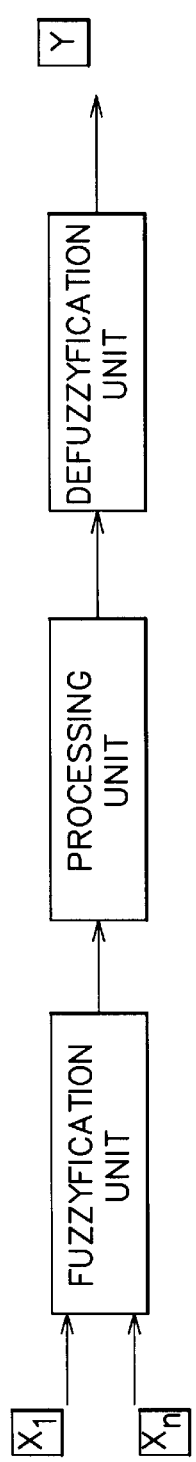
FIG. 1 is a block diagram of the structure of a fuzzy processor according to the prior art.
Figure 2:
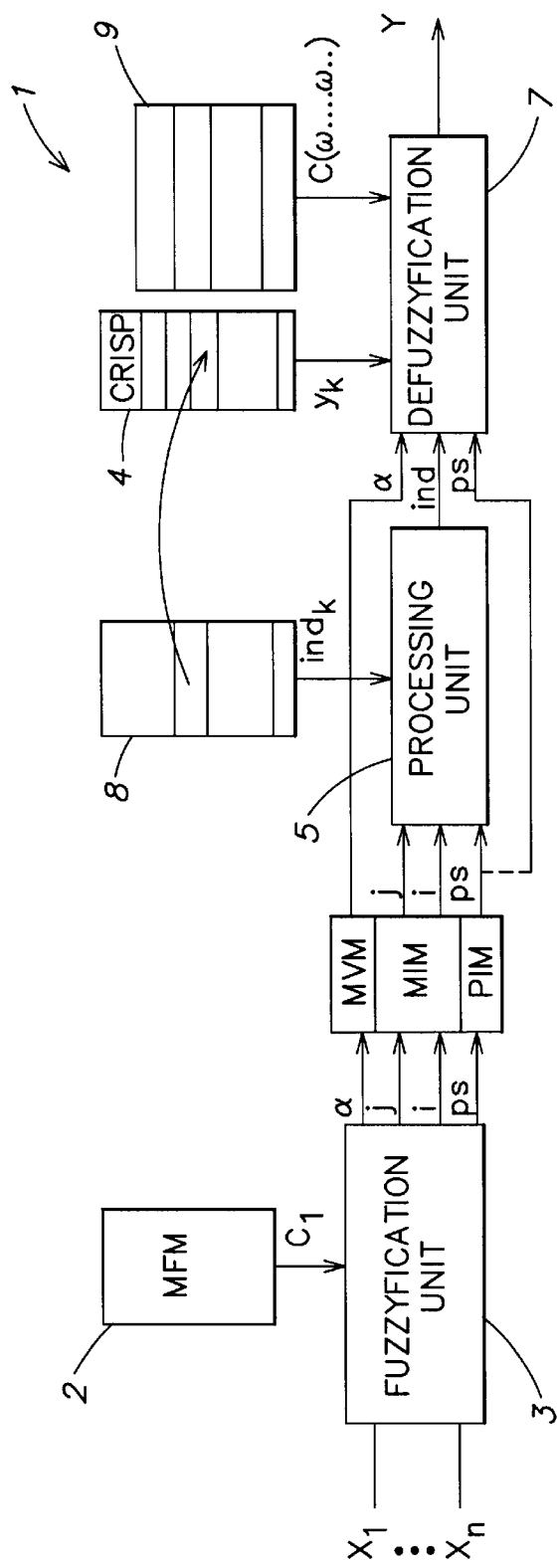
FIG. 2 is a block diagram of a fuzzy processor according to the invention.

Referring to the drawings, and particularly to the example in FIG. 2, generally and schematically shown at 1 is an electronic processor embodying this invention and operating in the fuzzy logics mode.

The processor 1 is a compact-size fast processor capable of processing a set of fuzzy rules having a limited number of input variables, for example, a number smaller than or equal to n input variables $X_1, \ldots, Y_n$, and a single output variable Y.

For simplicity, a basic structure of the processor 1 will be first described, followed by a possible implementation of a three-variable case, i.e. with n3.

The processor 1 comprises a cascade of:

a fuzzyfication unit 3 receiving a plurality of input variables $X_i$;

a processing unit 5 for processing fizz logic inference operations performed on said variables; and a defuzzyfication unit 7 adapted to translate the results of the inference operations into a so-called crisp value.

The processor 1 further comprises a memory device 2 or MFM (Membership Functions Memory) which is connected to the unit 3 and adapted to contain the set of terms utilized, that is the set of membership functions having the characteristics specified under (1) and (2) above.

Figure 3:
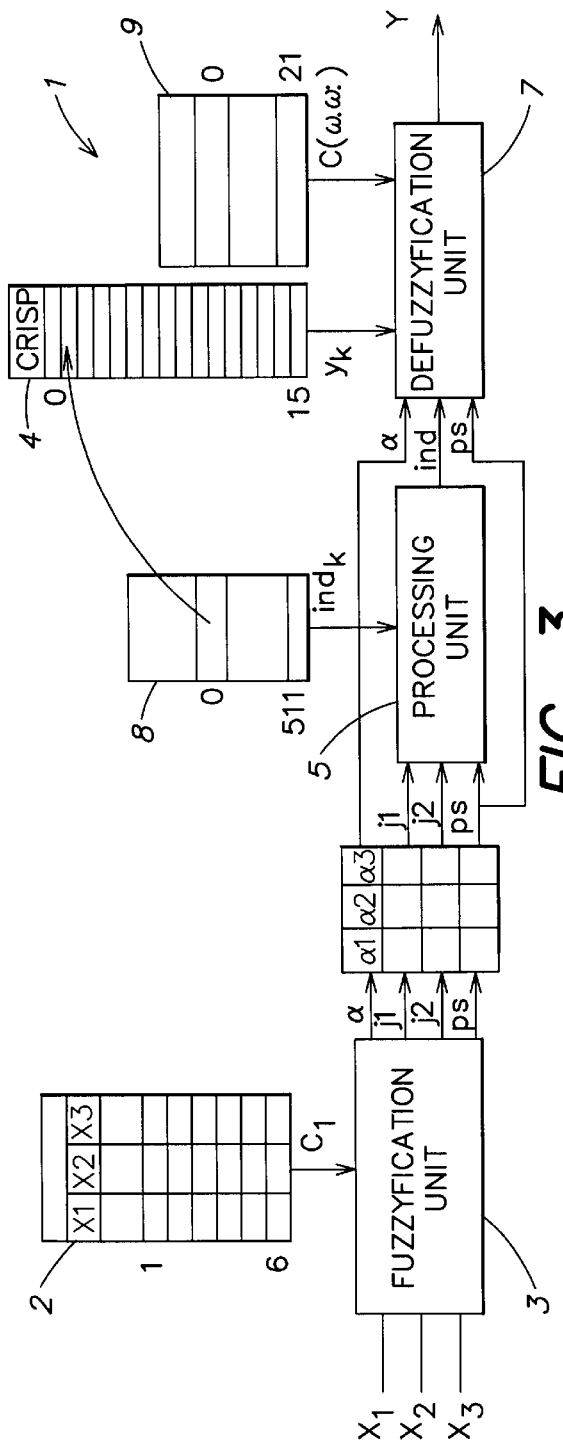
FIG. 3 is a block diagram of a preferred embodiment of the processor shown in FIG. 2.

In the example of FIG. 3, the device 2 includes a volatile read/write memory, such as a RAM, containing parameters of membership functions of the triangular type.

Preferably, there are up to eight such functions per backing range.

Figure 4:
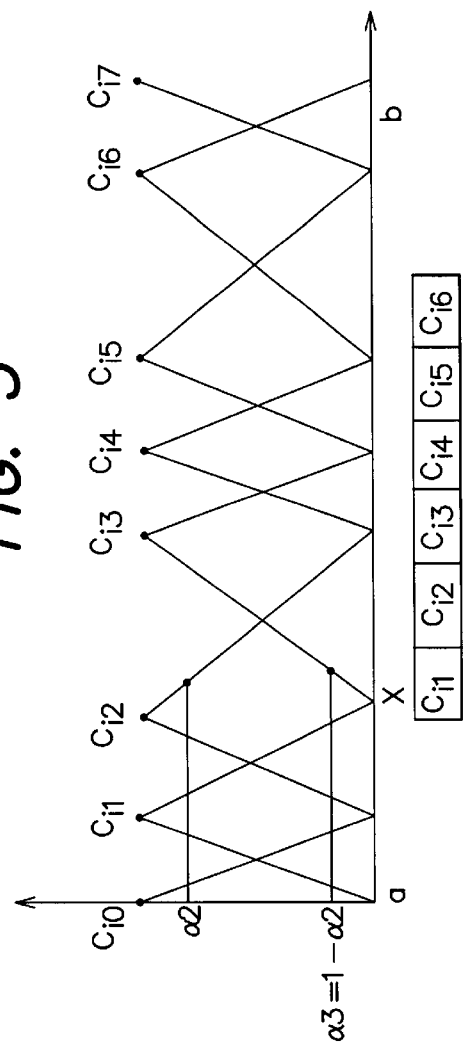
FIG. 4 is a graph with a set of membership functions of input variables to the processor of FIG. 3.

Shown in FIG. 4 are the types of membership functions utilized, and the parameters to be stored in the device 2. Each membership function is identified by the position of its apex, and since two of the apices will always locate at the extremities, only six parameters need to be stored.

For storing the three degrees of membership computed by the unit 3—each expressed by three bits because the membership values below 0.5 are considered—a vector with three elements of three bits each is used.

The fuzzyfication unit 3 receiving the input variables is, therefore, connected to the memory device 2. For each input configuration $X_i, \ldots, X_n$, this unit 3 will identify the two active terms $C_{ij}$ and $C_{ij+1}$ relating to each variable $X_i$, and compute the degree of membership, $\propto_{ij}$, of each variable $X_i$ in the term $C_{ij}$.

The lower of the $\propto_{ij}$ and $\propto_{ij+1}$ degrees is stored into a register or MVM (Membership Values Memory) connected to an output of the unit 3. The indicia j and j+1 are stored into a second register or MIM (Membership Index Memory) connected to a pair of outputs of the unit 3. In this way, the index associated with the parameter stored in the MVM register can be discriminated.

Another assignment of the unit 3 is to compare the 1 parameters stored in the MVM register with each other to have them aligned logically, and store a code of that alignment into a third register or PIM (Position Index Memory). In the instance being discussed, the apices $C_{ij}$ and $C_{ij+1}$ are identified by means of a dichotomic search algorithm, while the degree of membership of the variable $X_i$ in the term $C_{ij}$ is identified using membership functions of triangular shape, and according to the following formula:

$$a_{ij} = \frac{X_i - C_{i,j+1}}{C_{i,j} - C_{i,j+1}}$$

This parameter is expressed by four bits. The lower of the $\propto_{ij}$ and $\propto_{ij+1}=1\propto_{ij}$ degrees is stored at the i-th location of the MVM register and its index at location (I,j) of the MIM register.

The index of the other $\propto$ parameter, higher than 0.5, is stored at location (i,j+1) of the second MIM register.

In the example of FIG. 4, in order to store the six indicia varying between 0 and 7, a matrix of 2×3 elements with three bits each is used, since there are eight membership functions.

As for the alignment of the $\propto$ parameters, three indicia $ps_1, ps_2, ps_3$ are identified and written into the third PIN register, so that for any values of i=1, 2, 3, it is $\omega_i = \propto_{psi}$.

As shown in FIG. 4, to store the tree indicia varying between 0 and 2, a vector with three elements of two bits each is used.

The structure of the processor 1 further includes a second CVM (Crisp Values Map) memory device 4 adapted to contain the set of crisp value which appear in the THEN part or portion of the fuzzy rules.

This device 4 is connected to the defuzzyfication unit 7 being connected downstream of the processing unit 5, but receives the outputs from the first MVM and third PIM registers on respective inputs.

In the example of FIG. 3, the device 4 is provided with a volatile memory of the RAM type which can store up to sixteen crisp values.

The processor 1 further includes a third memory device 8 or CVPM (Crisp Values Pointer Memory) adapted to contain pointers to the crisp values contained in the previous device 4. The device 8 is connected to the CPU 5.

The number of pointers is equal to the number of possible rules, and are stored in the same order.

Also in FIG. 3, an exemplary implementation is shown using a number of possible rules equal to 8×8×8=512 and a number of crisp values equal to 16. Here again, the use of a 2-kbit RAM is preferred for storing 512 4-bit pointers with 4-bit access.

The processing unit 5 is connected downs of the second MIM and third PIM registers.

This unit 5 uses the data contained in the stores MIM and PIM to identify the two active rules and the positions of their pointers to the crisp values in the device 8, to then return the contents thereof.

For instance, in the exemplary implementation, the four active rules, which are $2^3=8$, are identified starting from the smallest and proceeding in the same order as has been used for storing the pointers to the crisp values of such rules.

In particular, where a three-bit counter is used, eight words are generated, each calling for a different rule, as specified herein below.

Let $(b_1, b_2, b_3)$ be one of the words generated by the counter; $(\propto_1, \propto_2, \propto_3)$ the degrees of activation contained in the MVM register; and $(j_{11}, j_{12}, j_{21}, j_{22}, j_{31}, j_{32})$ the indicia of the active functions contained in the MIM register, then it will have the following corresponding rule:

$(X_1$ is $mf_{k(1)}$ and $X_2$ is $mf_{k(2)}$ and $X_3$ is $mf_{k(3)})$ where, $$k(i) = \begin{cases} j_{i1} & \text{if } b_i = 0 \\ j_{i2} & \text{if } b_i = 1 \end{cases} \quad \text{and } X_i \text{ is } mf_{k(i)} = \begin{cases} a_i & \text{if } b_i = 0 \\ 1 - a_i & \text{if } b_i = 1 \end{cases}$$

crisp value pointer position in the data base is computed as follows:

$$ind = 2^6 K(1) + 2^3 K(2) + k(3).$$

In order for the $2^{n-1}$ ones of the rules generated at the i-th step with i≦n to contain $\omega_i$, not $\omega_1, \ldots, \omega_{i-1}$, it will be sufficient to re-align the words generated by the counter in the same order as the indicia contained in the third PIM register, as illustrated by the following example:

let $(b_1, b_2, b_3)$ be one of the words generated by the counter, and $(ps_1, ps_2, ps_3)$ the contents of the PIM register, then the word will be aligned as $(b_{ps1}, b_{ps2}, b_{ps3})$.

The structure of the processor 1 is completed by a further memory device 9 or RI (ROM Inverter).

This device 9 is connected to the defuzzyfication unit 7, and is adapted to contain the set of possible values taken by the following function:

$$c(\omega_1, \ldots, \omega_{n-1}) = \frac{1}{1 + \sum_{i=1}^{n-1} 2^{n-i} \cdot \omega i}$$

as addressable by the values $\omega_1, \ldots, \omega_{n-1}$.

In the proposed embodiment, the memory device 9 is implemented by a combinational network that uses the value ind=$2^{3*}\omega_1\omega_2$ to address the related value $C(\omega_1, \omega_2)$. The choice is dictated by that the function c is non-injective and its condominium includes twenty one different values.

The defuzzyfication unit 7 is input the crisp value pointers relating to the active rules, and accesses the MVM and PIM registers to obtain the values $w_1, \ldots, w_{n-1}$. Having used the pointers to obtain the crisp values and picked up the value $C(w_1, w_{n-1})$ from the device 9, it will carry out the defuzzyfying step according to the following formula:

$$y_u = c(\omega_1, \ldots, \omega_{n-1}) \cdot (\omega_1 \cdot (y_1 + \ldots + y_{2^{n-1}}) + \omega_2 \cdot (y_{2^{n-1}+1} + \ldots + y_{3 \cdot 2^{n-2}}) + \ldots + \omega_n \cdot y_{2^{n-1}} (1-\omega_n) \cdot y_{2^n})$$

In the particular instance of the device being embodied as shown in FIG. 4, this formula would become:

$$y_u = c(\omega_1, \omega_2) \cdot (\omega_1 \cdot (y_1 + y_2 + y_3 + y_4) + \omega_2 \cdot (y_5 + y_6) + \omega_3 \cdot y_7 + (1-\omega_3) \cdot y_8)$$

The operation of the processor according to the invention will now be described, starting with the fizzy rule storing step.

Since in this invention, the architecture of the processor designed to process fuzzy rule systems with few input variables, it can be assumed of using all of the possible rules obtained after the set of terms of the n input variables employed has been fixed.

This is quite advantageous from the standpoint of memory space optimization because, with the rules (each susceptible of being expressed by the n-fold of the indicia of the terms appearing therein) being aligned in an upward order, using the alignment relationship for n-folds:
$(a_1, a_2, a_n) < (b_1, b_2, b_n) \Leftrightarrow \exists r: a_r < b_r$ e $a_i = b_i$ per $i < r$
it would be sufficient to store just the THEN portions in the same order.

Actually, this approach would be improved by the use of a CVPM map of the crisp values employed, and by the storing, relative to each rule, of a pointer to one of the values in the map. The role of the map in this context would be similar to that of a Colormap in video-image processing.

Now to analyze the step of computing the degree of activation. Considering that for computing the degree of activation of a rule, (n−1) comparisons are required, it can be appreciated that to compute the degree of activation of two activated rules each time, the number of comparisons must be of $$2*(n-1)$$

This number of comparisons can be greatly reduced and simplified on the grounds of the remarks herein below.

Let $\alpha_1, 1\alpha_1, \ldots, \alpha_n$, with $\alpha_i \leq 0.5$, be the important degrees of membership of the n input variables $X_1, \ldots, X_n$, and $\omega_1, \ldots, \omega_n, \omega_{n+1}, \ldots, \omega_{2n}$ be the aligned sequence of the same values, in an upward order, it can be shown that:
(a) $\omega_1 \ldots, \omega_n$ is the aligned sequence of $\alpha_i$'s;
(b) $\omega_{n+1} = 1 - \omega_n$
(c) $\omega_1, \ldots, \omega_n, \omega_{n+1}$ are the degrees of activation produced by the 2n rules.

To show that the first relationship (a) holds, assume for the sake of argument that there is an index smaller than or equal to n, i.e. $\exists I \leq n$ and $\exists j \leq n$ when $\omega_j = 1\alpha_i$, since $1\alpha_i \geq 0.5$, it follows that j>n, which is an absurdity.

To show that the second relationship (b) holds, if for point 1 there is an index j which is smaller than or equal to n, and $\omega_{n30\ 1} = 1 - \omega_j$, with the sequence of $\omega$'s being aligned and $\omega_{n+1}$ being the smallest among $(1-\omega_1, \ldots, 1-\omega_n)$, then: $\omega_1 < \omega_2 < \ldots < \omega_n$, which means that $1-\omega_1 > 1-\omega_2 > \ldots > 1-\omega_n$, whence j=n.

As regards the third relationship (c), since each of the $\alpha_i$'s appears in $2^{n-1}$ rules, it follows that.

the rules where $\omega_1$ appears, i.e. $2^{n-1}$, will have $\omega_1$ as their degree of activation because this is the least of the recurrent degrees of membership;

the rules where $\omega_2$ appears and $\omega_1$ does not, i.e. $2^{n-2}$, will have $\omega_2$ as their degree of activation because this is the least of the recurrent degrees of membership;

the rules where $\omega_i$ appears and iún and $\omega_1, \ldots, \omega_{i-1}$ do not appear, i.e. $2^{n-1}$, will have $\omega_i$ as their degree of activation because this is the least of the recurrent degrees of membership;

the single rule where $\omega_1, \ldots, \omega_n$ do not appear will have $\omega_{n+1}$ as its degree of activation In this way, and thanks to the processor architecture of his invention, it has become possible to generate the indicia of the active rules, at the i-th step with $i \leq n$, in such a manner that the $2^{n-1}$ rules generated contain $\omega_i$ and not $\omega_1, \ldots, \omega_{i-1}$, and therefore, the degree of activation of the activated rules can be simply computed by aligning n values which vary within the range of [0,0.5] to be represented with one bit less than the range of [0,1] and by the following number of comparisons:

$$2^{n*}(n-1)$$

In conformity with the foregoing, the alignment of the membership values, additionally to facilitating the computation of the activation values of the variables involved, affords considerable simplification of the defuzzyfying step. Based upon the measured characteristics of the degrees of activation, the defuzzyfication formula can be re-written as follows:

$$y_u = \frac{\sum_{k=1}^{2^n} y_k \omega \omega_{k_1}}{\sum_{k=1}^{2^n} \omega_{j_1}} = \frac{(\omega_1 \cdot (y_1 + \ldots + y_{2^{n-1}}) + \omega_2 \cdot (y_{2^{n-1}+1} + \ldots + y_{3 \cdot 2^{n-2}}) + \ldots + \omega_n \cdot y_{2^{n-1}}(1-\omega_n) \cdot y_{2^n}}{1 + \sum_{i=1}^{n-1} 2^{n-i} \cdot \omega_i}$$

where the numerator products have been reduced to n+1, and the summation in the denominator involves n−1 values from the [0,0.5] range multiplied by powers of 2 (to be obtained by means of the shift registers).

In view of that there may be a finite number of r values in the [0,0.5] range, since the [0,1] range is a discretized one, the defuzzyfication formula can be further cleared by first computing the values taken by the function, $$c(\omega_1, \ldots, \omega_{n-1}) = \frac{1}{1 + \sum_{i=1}^{n-1} 2^{n-i} \cdot \omega_i}$$

in a table with n−1 indicia with the sequence being aligned, the total number of such values will be, $$\sum_{j=1}^{r} j^{n-2}$$

but becomes even less when it is considered that many of them are identical.

In essence, the processor of this invention does solve the technical problem, and affords a number of advantages as listed herein below.

A first advantage is the number of degrees of membership that need to be computed. Given a system of rules having $X_1, \ldots, X_n$ as its input variables, it is readily seen that for conditions (1) and (2) it will be sufficient that n degrees of membership, i.e. one per input, be computed.

The number of active rules in a system with n input variables is, regardless of the number of rules used, always two, because this is the number of rules that can be applied when there are only two membership functions active and only the AND operator.

The computation steps, such as the part relating to the computation of the degrees of activation and the defuzzyfying step, are made much simpler. There are but two degrees of activation to be computed, and therefore, the defuzzyfication formula is less onerous from the computational standpoint, with two summations of $2^n$ elements and $2^{n-1}$ products being sufficient.

Major benefits of the architecture proposed herein are the high computation speed and compact size brought about by the fuzzy model that has been adopted and by certain logarithmic options.

Of these options, that of having the degrees of activation of the involved rules computed by a re-alignment of the degrees of membership is of great importance because it reduces and simplifies the minima operations.

By having the values of degrees of membership aligned together with the characteristics measured on the degrees of membership and the sum of the degrees of activation, it becomes possible to greatly simplify the defuzzyfing step, and reduce the computation complexity and space requirements.

It lends itself for the use of sixteen-bit inputs and outputs at the expense of but little additional space and throughput.

In a VHDL-tested implementation, this device had a size of about 5 mm and a throughput of about 400 ns.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A processor operating in a fuzzy logic mode comprising: a fuzzyfication unit for receiving a plurality of input variables on an input and for computing a membership value of such variables in a membership function; a processing unit connected downstream to the fuzzyfication unit for producing a fuzzy set; a defuzzyfication unit for translating inference results into a crisp value; a first memory device connected to the fuzzyfication unit for storing a set of membership functions, wherein a sum of the membership functions through a universe of discourse is unity and at any point of the universe of discourse, there are only two membership functions with a non-zero degree of membership; a second memory device connected to the defuzzyfication unit and containing a set of crisp values which appear in a THEN part of a fuzzy rule; and a further memory device connected to the defuzzyfication unit.

2. The processor according to claim 1, wherein the first memory device is a RAM.

3. The processor according to claim 1, wherein the membership functions are of the triangular type.

4. The processor according to claim 1, wherein the further memory device is a combinational network.

5. A processor operating in a fuzzy logic mode comprising: a fuzzyfication unit for receiving a plurality of input variables on an input and for computing a membership value of such variables in a membership function; a processing unit connected downstream to the fuzzyfication unit for producing a fuzzy set; a defuzzyfication unit for translating inference results into a crisp value; a first memory device connected to the fuzzyfication unit for storing a set of membership functions; a second memory device connected to the defuzzyfication unit and containing a set of crisp values which appear in a THEN part of a fuzzy rule; a further memory device connected to the defuzzyfication unit; and said processor farther comprising first, second and third registers connected to respective outputs of the fuzzyfication unit, the first register for storing degrees of membership of values computed by said fuzzyfication unit, the second register for storing an indicia identified by said fuzzyfication unit and related activated terms, and the third register for storing a code, as computed by said fuzzyfication unit, of a logic alignment of the degrees of membership stored in the first register.

6. The processor according to claim 5, wherein a smaller of the $\%_{ij}$ and $\%_{ij+1}=1\%_{ij}$ degrees of membership is stored at the i-th location in the first register, and a related index is stored at location in the second register.

7. The processor according to claim 5, wherein the fuzzyfication unit compares the % parameters stored in the first register with each other in order to align them logically and store a code of this alignment into the third register.

8. A processor operating in a fuzzy logic mode comprising: a fuzzyfication unit for receiving a plurality of input variables on an input and for computing a membership value of such variables in a membership function; a processing unit connected downstream to the fuzzyfication unit for producing a fuzzy set; a defuzzyfication unit for translating inference results into a crisp value; a first memory device connected to the fuzzyfication unit for storing a set of membership functions; a second memory device connected to the defuzzyfication unit for storing a set of crisp values which appear in a THEN part of a fuzzy rule; a further memory device connected to the defuzzyfication unit; and said processor comprising a third memory device connected to the processing unit for storing pointers to the crisp values stored in said second memory device.

9. A processor operating in a fuzzy logic mode comprising:

a fuzzyfication unit for receiving a plurality of input variables;

a processing unit coupled downstream to the fuzzyfication unit for processing fuzzy logic inference of said input variables;

a defuzzyfication unit for translating inference results into a crisp value;

a first memory device connected to the fuzzyfication unit for storing a set of membership functions, wherein a sum of said set of membership functions through a universe of discourse is unity; and a second memory device connected to the deification unit for storing a set of crisp values.

10. The processor according to claim 9 wherein the second memory device contains crisp values which appear in a THEN part of a fuzzy rule.

11. The processor according to claim 10 including a further memory device connected to the defuzzyfication unit.

12. The processor according to claim 11 wherein said fuzzyfication unit computes a membership value of such variables in a membership function.

13. The processor according to claim 12 wherein said processing unit produces a fuzzy set.

14. The processor according to claim 9 including a further memory device connected to the defuzzyfication unit.

15. The processor according to claim 14, wherein the further memory device is a combinational network.

16. The processor according to claim 9 wherein at any point of the universe of discourse, there are only two membership functions with a non-zero degree of membership.

17. The processor according to claim 16 wherein the membership functions are of the triangular type.

18. The processor according to claim 16 wherein the first memory device stores a set of membership functions having AND operator.

19. The processor according to claim 9 further comprising at least a first register connected to an output of the fuzzyfication unit for storing the degrees of membership of the values computed by said fuzzyfication unit.

20. A processor operating in a fuzzy logic mode comprising:

a fuzzyfication unit for receiving a plurality of input variables;

a processing unit coupled downstream to the fuzzyfication unit for processing fuzz logic inference of said input variables;

a defuzzyfication unit for translating inference results into a crisp value;

a first memory device connected to the fuzzyfication unit for storing a set of membership functions;

a second memory device connected to the defuzzyfication unit for storing a set of crisp values;

a first register connected to an output of the fuzzyfication unit for storing the degrees of membership of values computed by said fuzzyfication unit; and a second register for storing an indicia identified by said fuzzyfication unit and related activated terms.

21. The processor according to claim 20 further comprising a third register for storing a code, as computed by said fuzzyfication unit, of a logic alignment of the degrees of membership stored in the first register.

22. A processor operating in a fuzzy logic mode comprising:

a fuzzyfication unit for receiving a plurality of input variables;

a processing unit coupled downstream to the fuzzyfication unit for processing fuzzy logic inference of said input variables;

a defuzzyfication unit for translating inference results into a crisp value;

a fist memory device connected to the fuzzyfication unit for storing a set of membership functions;

a second memory device connected to the defuzzyfication unit for storing a set of crisp values; and said processor further comprising first, second and third registers connected to respective outputs of the fuzzyfication unit, the first register for storing degrees of membership of the values computed by said fuzzyfication unit, second register for storing an indicia identified by said fuzzyfication unit and related activated terms, and the third register containing a code, as computed by said fuzzyfication unit, of a logic alignment of the degrees of membership contained in the first register.

23. The processor according to claim 22, wherein a smaller of the $\%_{ij}$ and $\%_{ij+1}=1\%_{ij}$ degrees of membership is stored at the I-th location in the first register, and a related index is stored at location in the second register.

24. The processor according to claim 23, wherein the fuzzyfication unit compares the % parameters stored in the first register with each other in order to align them logically and store a code of this alignment into the third register.

25. A processor operating in a fuzzy logic mode comprising:

a fuzzyfication unit for receiving a plurality of input variables;

a processing unit coupled downstream to the fuzzyfication unit for processing fuzzy logic inference of said input variables;

a defuzzyfication unit for translating inference results into a crisp value;

a first memory device connected to the fuzzyfication unit for storing a set of membership functions;

a second memory device connected to the defuzzyfication unit for storing a set of crisp values; and a third memory device connected to the processing unit for storing pointers to the crisp values stored in said second memory device.

26. A processor operating in a fuzzy logic mode comprising:

a fuzzyfication means for receiving a plurality of input variables;

a processing means coupled downstream to the fuzzyfication means for processing fuzzy logic inference of said input variables;

a defuzzyfication means for translating inference results into a crisp value;

a first storage means connected to the fuzzyfication means for storing a set of membership functions, wherein a sum of said set of membership functions through a universe of discourse is unity; and a second storage means connected to the defuzzyfication means for storing a set of crisp values.

27. The processor according to claim 26 wherein the second storage means stores crisp values which appear in a THEN part of a fuzzy rule.

28. The processor according to claim 27 including a further storage means connected to the defuzzyfication means.

29. The processor according to claim 28 wherein said fuzzyfication means computes a membership value of such variables in a membership function.

30. The processor according to claim 29 wherein said processing means produces a fix set.

31. The processor according to claim 26 including a further storage means connected to the defuzzyfication means.

32. The processor according to claim 31, wherein the further storage means is a combinational network.

33. The processor according to claim 26 wherein at any point of the universe of discourse, there are only two membership functions with a non-zero degree of membership.

34. The processor according to claim 33 wherein the membership functions are of the triangular type.

35. The processor according to claim 33 wherein the first storage means stores a set of membership functions having the AND operator.

36. The processor according to claim 26 further comprising at least a register means connected to an output of the fuzzyfication means for storing the degrees of membership of values computed by said fuzzyfication means.

37. A processor operating in a fuzzy logic mode comprising:
    a fuzzyfication means for receiving a plurality of input variables;
    a processing means coupled downstream to the fuzzyfication means for processing fuzzy logic inference of said input variables;
    a defuzzyfication means for translating inference results into a crisp value;
    a first storage means connected to the fuzzyfication means for storing a set of membership functions;
    a second storage means connected to the defuzzyfication means for storing a set of crisp values;
    a first register means connected to an output of the fuzzyfication means for storing degrees of membership of values computed by said fuzzyfication means; and
    a second register means for storing an indicia identified by said fuzzyfication means and related activated terms.

38. The processor according to claim 37 further comprising a third register means containing a code, as computed by said fuzzyfication means, of a logic alignment of the degrees of membership stored in the first register means.

39. A processor operating in a fuzzy logic mode comprising:
    a fuzzyfication means for receiving a plurality of input variables;
    a processing means coupled downstream to the fuzzyfication means for processing fuzzy logic inference of said input variables;
    a defuzzyfication means for translating inference results into a crisp value;
    a first storage means connected to the fuzzyfication means for storing a set of membership functions;
    a second storage means connected to the defuzzyfication means for storing a set of crisp values; and
    said processor further comprising first, second and third register means connected to respective outputs of the fuzzyfication means, the first register means for storing degrees of membership of values computed by said defuzzyfication unit, the second register means for storing an indicia identified by said defuzzyfication unit and related activated terms, and the third register means for storing a code, as computed by said defuzzyfication unit, of a logic alignment of the degrees of membership stored in the first register.

40. The processor according to claim 39, wherein a smaller of the $\%_{ij}$ and $\%_{ij+1}=1\%_{ij}$ degrees of membership is stored at the I-th location in the first register means, and a related index is stored at location in the second register means.

41. The processor according to claim 40, wherein the fuzzyfication means compares the % parameters stored in the first register means with each other in order to align them logically and store a code of this alignment into the third register means.

42. The processor according to claim 39, further comprising a third storage means connected to the processing means for storing pointers to the crisp values stored in said second storage means.

* * * * *

UNITED STATES PATENT AND TRADEMARK OFFICE
CERTIFICATE OF CORRECTION

PATENT NO.  : 6,256,617 B1
DATED       : July 3, 2001
INVENTOR(S) : Antonino Cuce' and Enrico Pelos It is certified that error appears in the above-identified patent and that said Letters Patent is hereby corrected as shown below:

Column 5,
The equation should read:

$$c(\omega_1,...,\omega_{n-1}) = \frac{1}{1 + \sum_{i=1}^{n-1} 2^{n-i} \cdot \omega_i}$$

Column 6,
The equation should read:

$$y_u = \frac{\sum_{k=1}^{2^n} y_{k\omega} \omega_{k_i}}{\sum_{k=1}^{2^n} \omega_{j_i}} = \frac{(\omega_1 \cdot (y_1 + .. + y_{2^{n-1}}) + \omega_2 \cdot (y_{2^{n-1}+1} + ... + y_{3 \cdot 2^{n-2}}) + ... + \omega_n \cdot y_{2^n-1}(1-\omega_n) \cdot y_{2^n}}{1 + \sum_{i=1}^{n-1} 2^{n-i} \cdot \omega_i}$$

Signed and Sealed this

Fifth Day of March, 2002

Attest:

JAMES E. ROGAN
Attesting Officer    Director of the United States Patent and Trademark Office